(12) United States Patent
Verduijn et al.

(10) Patent No.: US 7,331,446 B2
(45) Date of Patent: Feb. 19, 2008

(54) CHAIN MODULAR AND MODULAR CHAIN CONVEYOR

(75) Inventors: Gijsbertus Johannes Verduijn, Terheijden (NL); Leonardus Adrianus Cornelissen, The Hague (NL)

(73) Assignee: Rexnord Flattop Europe B.V., GV'S-Gravenzande (NL)

( * ) Notice: Subject to any disclaimer, the term of this patent is extended or adjusted under 35 U.S.C. 154(b) by 0 days.

(21) Appl. No.: 10/538,056

(22) PCT Filed: Dec. 9, 2003

(86) PCT No.: PCT/NL03/00867

§ 371 (c)(1),
(2), (4) Date: Mar. 31, 2006

(87) PCT Pub. No.: WO2004/052759

PCT Pub. Date: Jun. 24, 2004

(65) Prior Publication Data
US 2006/0191774 A1   Aug. 31, 2006

(30) Foreign Application Priority Data
Dec. 10, 2002   (NL) .................... 1022132

(51) Int. Cl.
*B65G 15/42* (2006.01)

(52) U.S. Cl. .............. 198/844.1; 198/805; 198/850; 198/853

(58) Field of Classification Search .......... 198/844.1, 198/805, 853
See application file for complete search history.

(56) References Cited

U.S. PATENT DOCUMENTS

| | | | | |
|---|---|---|---|---|
| 5,586,644 A | * | 12/1996 | Coen et al. ............. | 198/853 |
| 6,581,758 B1 | * | 6/2003 | van-Zijderveld et al. ... | 198/853 |
| 6,601,696 B1 | * | 8/2003 | van Zijderveld et al. ... | 198/805 |

FOREIGN PATENT DOCUMENTS

| | | |
|---|---|---|
| EP | 0 480 863 A | 4/1992 |
| EP | 0711 714 A | 5/1996 |

OTHER PUBLICATIONS

International Search Report corresponding to PCT/NL03/00867, under date of mailing of Mar. 15, 2004.

* cited by examiner

*Primary Examiner*—Gene O. Crawford
*Assistant Examiner*—Kavel Singh
(74) *Attorney, Agent, or Firm*—Quarles & Brady LLP

(57) ABSTRACT

A chain module (1) for a modular chain conveyor comprising a substantially sheet-shaped body part (2), provided with a conveying surface (3) located at an upper side of the body part (2), with hinge holes (4A1, 4A2, 4B) included in the body part (2) and with two projections (15A, 15B) provided at the underside (14) of the body part (2), wherein sliding faces (17A, 17B) located at the sides (16A, 16B) facing each other of the projections (15A, 15B), together with a sliding face (18) located between the projections (15A, 15B) at the underside (14) of the body part (2), form a guide with substantially U-shaped cross section. The projections (15A, 15B) have been provided at a distance from sides (7, 8) of the body part (2) and adjacent the projections (15A, 15B) at the underside (14) of the body part (2), sliding faces (19A, 19B) are located, each forming, with sliding faces (19A, 19B) located at sides (20A, 20B) facing away from each other of the projections (15A, 15B), a longitudinal guide with substantially L-shaped cross section.

16 Claims, 7 Drawing Sheets

CHAIN MODULAR AND MODULAR CHAIN CONVEYOR

CROSS-REFERENCE TO RELATED APPLICATIONS

This application claims priority to International Patent Application PCT/NL2003/000867 filed 9 Dec. 2003, which claims priority of NL application 1022132 filed 10 Dec. 2002.

The invention relates to a chain module for a modular chain conveyor, comprising a substantially sheet-shaped body part provided with a conveying face located at an upper side of the body part, with hinge holes included in the body part and with two projections provided at an underside of the body part, while sliding faces located at the sides facing each other of the projections, together with a sliding face located between the projections at the underside of the body part, form a longitudinal guide with a substantially U-shaped cross section.

Such a chain module is known from EP 0 711 714 and is used, in a row of successive modules, to be formed into a conveyor chain with an articulated conveying face, which can be moved forward over a guide path in a conveying direction. The articulated conveying surface is then built up from the conveying faces of the separate modules. The hinge holes of the successive modules are coupled with the aid of hinge pins, so that each time, successive modules can pivot relative to each other about an axis located in or along the conveying plane and extending substantially transversely to the conveying direction. As a result, the chain can be guided around a sprocket wheel. The hinge pins are then included with clearance between the coupled hinge loops, so that further, each time, successive modules can pivot relative to each other about an axis extending substantially transversely to the conveying plane. As a result, the chain can be guided along a bend in a flat plane. Instead of a conventional connecting block, included in a centered position below the body part and provided with hinge loops, the module according to EP 0 711 714 has hinge holes included in the body part and two projections provided at the side of the body part. As a result, while maintaining a compact construction, the module can be guided along a bend in the guide path in a stable manner. Further, the projections bear lips, facing each other. When a bend in the guide path is being negotiated, these lips are intended to cooperate by an upper face with a lower face of a corresponding lip which extends sideways at the upper side of a guide bend segment having, as basic shape, a rectangular cross section. Thus, tilting of the chain module in the conveying plane when negotiating a bend is prevented.

However, a drawback of the module known from EP 0 711 714 is that it cannot cooperate with a conventional guide path, running straight, in which a number of parallel chains run on and between a number of parallel wear strips, spaced apart relative to each other at a pitch of for instance 85 mm with an interspace of approximately 44 mm. Instead thereof, a separate guide must be arranged for each chain track, so that additional measures need to be taken for adjusting the conveying faces of the modules of adjoining chains to equal height.

A further drawback of the known module and the associated guide bend segment is that, because of their relatively small contact face, the cooperating lips are sensitive to wear and cause relatively high friction.

The invention contemplates a chain module of the type mentioned in the opening paragraph, with which, while maintaining the advantages, the drawbacks mentioned can be obviated. To that end, the chain module according to the invention is characterized in that the projections have been provided at a distance from the sides of the body part, and in that adjacent the projections, at the underside of the body part, sliding faces are located, each forming, with sliding faces located at sides facing away from each other of the projections, a longitudinal guide with a substantially L-shaped cross section. By providing the projections below the body part in an inwardly staggered manner relative to the side edge of the body part, in a part of the guide path running straight, the chain module can be included in a conventional guide. The L-shaped part of the guide can then cooperate with a part of the upper side and with the sides of the wear strips. When negotiating a bend in the guide path, at least a part of the connecting part and one leg of the U-shaped part of the longitudinal guide can cooperate with at least a part of the upper side and a side face of a central projection of a guide bend segment. Further, the lying parts of the L-shaped guide can cooperate with an inside bend face and an outside bend face of the guide bend segment, so that good support takes place. As the module is provided with separate guides for cooperation with a guide bend segment and a straight guide, respectively, the module can cooperate with a conventional guide and still be optimally guided along a bend.

Preferably, the hinge holes extend along a front and rear side of the module and the cross sections of the holes at the front and rear side are different, at least locally. What can be achieved in an elegant manner by thus selecting the cross section of the holes to be wider on one side over at least a part of the length is that cooperating hinge loops of successive modules can be coupled with clearance, via a hinge pin so that successive modules can pivot relative to each other about an axis transverse to the conveying plane, while the hinge pin can be fixed in the tighter hinge holes. Naturally, it is also possible to design the hinge holes at the front as well as at the rear to be oversize relative to the hinge pin. In that case, the cross sections of the hinge holes at the front and rear side can be equal. It is also possible to equip successive modules alternately with, on the one hand, slotted holes at the front and rear side and, on the other hand, with mating holes at the front and rear side.

Preferably, the cross section of the holes is constant on one side and the cross section of the holes at the opposite side is selected to be at least equal in size and greater over at least a part of the length. The hinge pin can then be fixed in the holes with constant cross section, for instance by means of a knurled screw ending on the hinge pin. What can be achieved due to the changing diameter of an oversize hole is that the hinge pin between successive modules, when negotiating a bend in the conveying plane, abuts against the edge of the hinge on a predetermined location. Preferably, the location with the minimal cross section in the middle of the hinge loop is selected, so that the pin abuts adjacent the edge of the hinge loop, and the location where the force between the hinge loop and the pin is transmitted, is substantially above the location where one leg of the U-shaped part of the guide cooperates with a side face of the central projection of a guide bend segment located at the radial outer side.

In an advantageous manner, the hinge holes of the body part jointly extend over substantially the entire width of the body part. Hinge pins for coupling successive modules are thus enabled to extend over substantially the entire width of the body part. It is noted that the hinge holes adjacent one of the sides can be contiguous to a stop face, so that the hole is designed as a blind hole. With such a blind hole, the stop face is provided with an opening through which a dowel can reach for pushing the hinge pin from the hinge hole. Further, the hinge holes can be provided adjacent the side with a closing element, such as a closing clip.

Preferably, the space between the sides of the projections facing each other is clear. What is achieved as a result thereof is that the sliding faces located at the sides facing each other of the projections can cooperate over their entire surface with a corresponding side face of a central projection of a guide bend segment, so that friction and wear can be minimized.

By designing the sliding faces of the sides facing each other of the projections to converge from the body part, tilting of the module when negotiating a bend in the conveying plane can be prevented when the projections cooperate with a central projection with sides formed correspondingly, converging towards the base. In an alternative embodiment, the sliding faces at the sides facing each other of the projections extend substantially transversely to the underside of the body part. As a result, friction can be reduced when negotiating a bend. Tilting of the module can then be prevented by realizing a magnetic attractive force between the bend segment on the one side and the module and/or the hinge pins on the other side.

Preferably, on a part of the front or rear side of the body part extending between the sides facing each other of the projections, a driving face is provided for cooperation with a tooth flank of a sprocket wheel.

In an advantageous manner, one or more sliding faces can be formed by insert pieces. What can be achieved as a result thereof is that only at the location of the insert piece, the material properties are to be optimized for sliding friction. Optionally, the insert pieces can be detachably connected to the body part and/or the projections.

By selecting the height of the body part between the underside of the body part and the conveying surface to be equal to the customary height of a module of a modular conveyor mat, the modular chain can easily be deployed in addition to a modular conveyor mat with minimal modifications to the guide path. Preferably, this height is 12.7 mm. It is noted that within this context, sheet-shaped is understood to mean a sheet-shaped body part with a relatively great thickness, so that a hinge pin can be included between the top and bottom face of the sheet.

Further advantageous embodiments of the invention are represented in the subclaims.

The invention will be further elucidated with reference to an exemplary embodiment represented in a drawing. In the drawing.

The Figures are only schematic representations of preferred embodiments of the invention. In the Figures, identical or corresponding parts are indicated with the same reference numerals.

Figure 1:
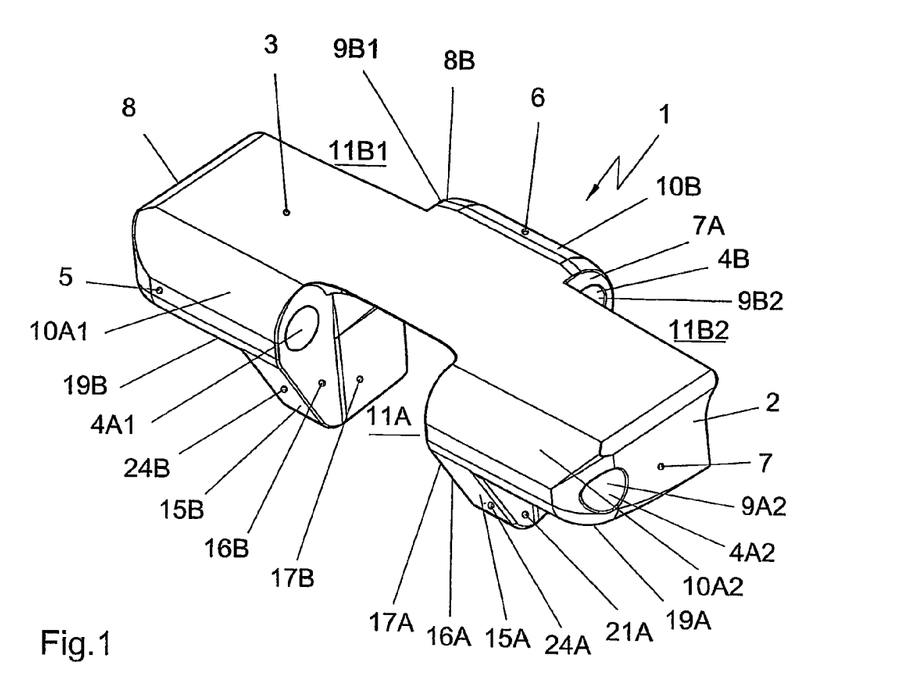
FIG. 1 shows a schematic perspective top plan view of a chain module according to the invention.
Figure 2A:
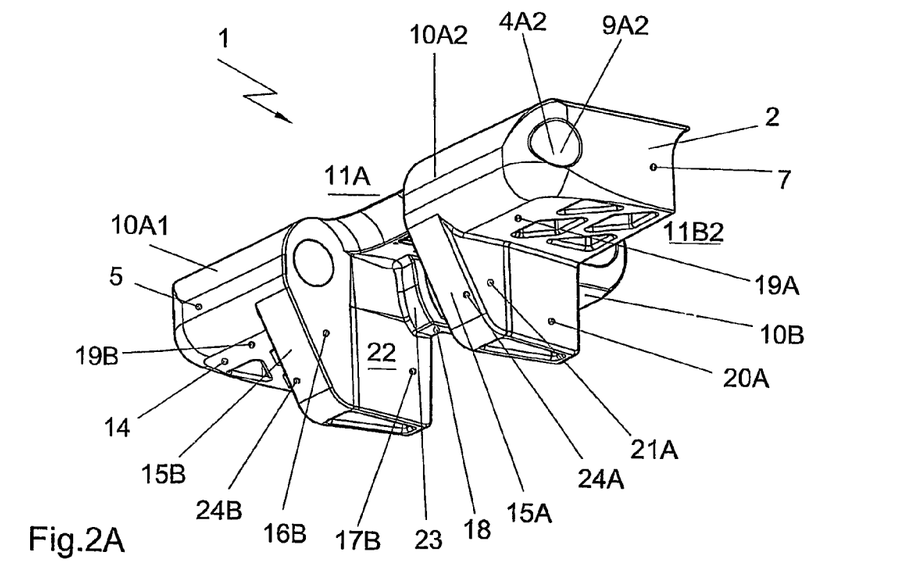
FIGS. 2A and FIG. 2B schematically show perspective bottom views of the module of FIG. 1.
Figure 2B:
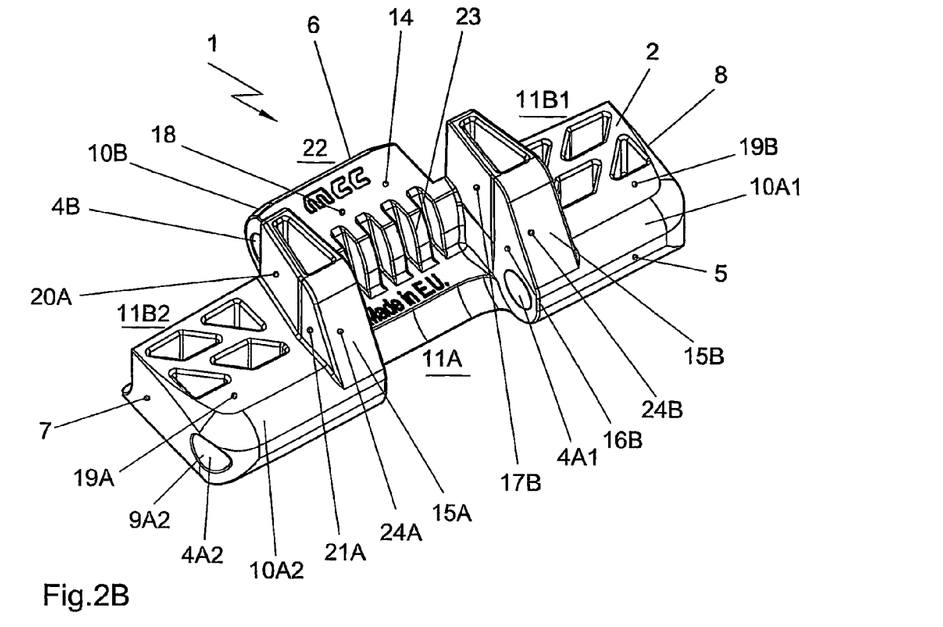
Figure 3:
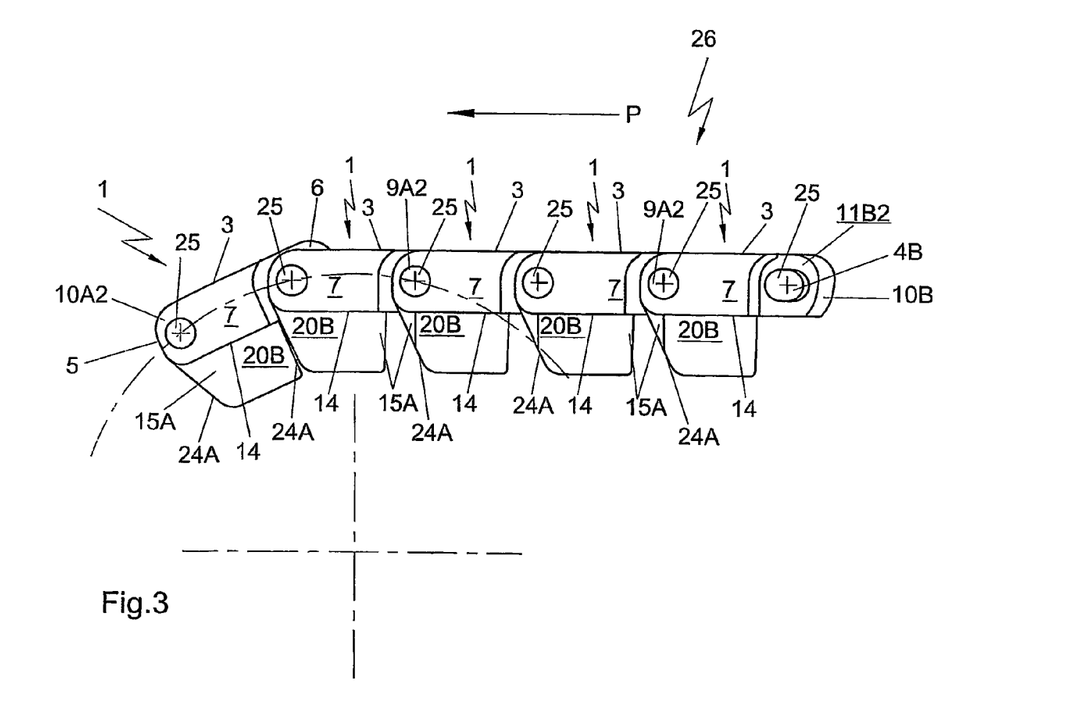
FIG. 3 schematically shows a side view of a number of modules, successive in a conveying direction which, with the aid of hinge pins reaching through cooperating hinge loops, are coupled to form a conveyor chain and which run around a sprocket wheel (not represented)

Referring to FIGS. 1-3, a chain module 1 for a modular conveyor chain is shown. The chain module 1 comprises a sheet-shaped body part 2, also indicated by the skilled person with the name "bled". The sheet-shaped body part 2 is provided with a conveying face located on an upper side 3 of the body part 2 for conveying products thereon. The conveying face can be substantially flat and be in direct contact with the products to be conveyed, but can also bear contact means such as protrusions or fingers. Further, the conveying face can not only be closed as represented in the Figure, but it can also be open, for instance in that the body part 2 is provided with a number of holes extending from the upper side 3 as far as the underside 14. The body part 2 is further provided with hinge holes 4 included in the body part. The hinge holes 4 extend along a front 5 and along a rear 6, in transverse direction between sides 7, 8 of the body part 2 of the module 1. Together, the hinge holes 4a1, 4a2, 4b extend over at least the entire width of the body part 2. Near the front 5, the sides 7, 8 of the body part 2 are each provided with an opening 9a1, 9a2 of the hinge holes 4a1, 4a2.

On the front 5, the body part 2 is further provided with two bulging hinge loops 10a1, 10a2 with a recess 11a located therebetween. On the opposite side, in this case the rear 6, the body part 2 is provided with a bulging hinge loop 10b formed correspondingly to the recess 11a. The two bulging hinge loops 10a1, 10a2 at the front 5 of the body part are provided with coaxial hinge holes 4a1, 4a2 with equal, constant cylindrical cross-section. The hinge loop 10b, formed correspondingly to the recess 11a, at the opposite side, in this case the rear 6, is provided with a slotted hole 4B lying with the longitudinal axis of the slot in the longitudinal direction of the body part 2. Adjacent the center, the cross section of the slotted hole 4b is greater than the cross section of the cylindrical holes 4a1, 4a2. The cross section increases in the direction of the openings 9b1, 9b2 located at the respective sides 7a, 8b of the hinge loop 10b at the rear 6 of the body part 2.

At an underside 14 of the body part 2, projections 15a, 15b are provided. The projections 15a, 15b are spaced apart in transverse direction to the body part 2 and extend downwardly relative to the underside 14. At the sides 16a, 16b facing each other, the projections 15a, 15b are provided on their surface with inner sliding faces 17a, 17b. The inner sliding faces 17a, 17b can extend over the entire surface of the sides 16a, 16b facing each other, but, as represented in the Figure, can also occupy only a part of the surface of the sides 16a, 16b. This has as an advantage that possible vibrations on the inner sliding faces 17a, 17b, upon cooperation with the respective sides of the central projection of a guide bend segment, can be prevented. Further, at the underside 14 of the body part 2, between the projections 15a, 15b, a central sliding face 18 is located. In this exemplary embodiment, this central sliding part 18 corresponds with the part of the underside 14 of the body part 2 located between the projections 15a, 15b which also extends over the underside of the hinge loop 10b at the rear 6 of the body part 2.

The inner sliding faces 17a, 17b located on the sides 16a, 16b facing each other of the projections 15a, 15b, together with central sliding face 18 located between the projections, form a longitudinal guide with substantially U-shaped cross-section at the underside of the body part 2.

The projections 15a, 15b are each provided at an equal distance from the respective sides 7, 8 of the body part 2. Adjacent the projections 15a, 15b, at the underside 14 of the body part 2, auxiliary sliding faces 19a, 19b are located. The outer auxiliary sliding faces 19a, 19b correspond with the parts of the underside 14 of the body part 2 located adjacent the respective projections 15a, 15b and also extend over the undersides of the forwardly extending hinge loops 10a1, 10a2.

At the sides 20a, 20b facing away from each other of the projections 15a, 15b, outer sliding faces 21a, 21b are located. In this exemplary embodiment, the outer sliding faces 21a, 21b extend over a part of the entire surface of the sides 20a, 20b facing away from each other of the projections 15a,15b.

The outer sliding faces 21a, 21b can extend over the entire surface of the sides 20a, 20b facing away from each other, but, as represented in the Figure, can also occupy only a part of the surface of the side 20a, 20b. This has the advantage that, when the outer sliding faces 21a, 21b cooperate with the sides of the wear strips of a straight part of the guiding path, possible vibrations are reduced.

The auxiliary sliding faces 19a, 19b located adjacent the projections 15a, 15b at the underside 14 of the body part 2, together with the outer sliding faces 21a, 21b located at the sides 20a, 20b facing each other of the projections 15a, 15b, each form a longitudinal guide with a substantially L-shaped cross-section. Thus, viewed in longitudinal direction of the body part 2 of the module 1, at the underside 14, a U-shaped or channel-shaped guide, open towards the bottom, is provided which is enclosed on both sides by two mirrored L-shaped or angle-guides. In this exemplary embodiment, the inner sliding faces 17a, 17b and the outer sliding surfaces 21a, 21b extend substantially transversely to the underside 14. However, it will be clear that the two sliding faces 21a, 21b can converge or diverge relative to each other in outward direction away from the underside 14 of the body part 2, and that, independently thereof, the inner sliding faces 17a, 17b can converge or diverge relative to each other.

Between the sides 16a, 16b facing each other of the projections 15a, 15b, a space 22 is formed which is clear of obstructions for including a central projection of a guide bend segment therein. At the location of the space 22, at a part of the front 5 extending between the projections 15a, 25b, the body part 2 is provided with a recess in the body part 2 with a driving face 23. The driving face 23 is intended for cooperation with the tooth flanks of a sprocket wheel. At their basis, the projections 15a, 15b extend in longitudinal direction from the front of the module at the location of the forward reaching hinge loops 10a1, 10a2, as far as the rear 8 of the body part at the location of the recesses 11b1, 11b2, located adjacent the rearward reaching hinge loop 10b. At their front sides 24a, 24b, the projections 15a, 15b are provided with a bevel. In this exemplary embodiment, the height of the body part 2 is 12.7 mm.

Referring to FIG. 3, it is shown that with the aid of hinge pins 25, two modules 1, successive in a conveying direction indicated with an arrow P, are formed into a conveyor chain 26 with an articulated conveying face. The conveyor chain 26 can then, for instance, be formed into an endless belt which proceeds between at least two sprocket wheels, while the conveyor chain 26 can be driven with the aid of tooth flanks of at least one of the sprocket wheels, which tooth flanks cooperate with the driving faces 23. In FIG. 3 it is shown how the successive modules 1 of the conveyor chain 26 can proceed around a sprocket wheel (not shown).

The hinge pins 25 are provided with a knurled screw ending with which they have been fixed in the hinge holes 4a1, 4a2 of the forwardly extending hinge loops 10a1, 10a2. The hinge pins lock in a rearward extending hinge loop 10b of a preceding module 1. The hinge pin 25 passes through the hinge hole 4b designed as a slotted hole of the rearward reaching hinge loop so that successive modules 1 can negotiate a bend in a lying plane, in particular an articulated conveying plane formed by an upper part of an endless chain. Preferably, the pin 25 is designed from a magnetizable material such as steel, but can also be manufactured from magnetic or non-magnetic material. In this exemplary embodiment, the length of the pin is substantially equal to the width of the module 1 and, in this exemplary embodiment, is approximately 75 mm. Preferably, the length of the pin is greater than the length of a hinge pin for a conventional chain module and is, preferably, greater than approximately 44 mm. In this exemplary embodiment, the diameter of the pin is smaller than the customary diameter for chains of 8 mm, for instance approximately 6 mm. The diameter of the pin can vary over the length and can, for instance, be thicker in a central part than at the extremities for confining the pin between two loops. It is noted that the hinge pins can also be designed to have a D-shape and that it is further possible to design the hinge holes to be slightly smaller at one side of the module. As shown, the hinge pins can cooperate with one or more mating hinge loops of a module and with one or more oversize hinge loops of a successive module. However, it is also possible to connect successive modules via a "loose" pin, by including the pin in the two consecutive modules in oversize hinge loops.

Figure 4A:
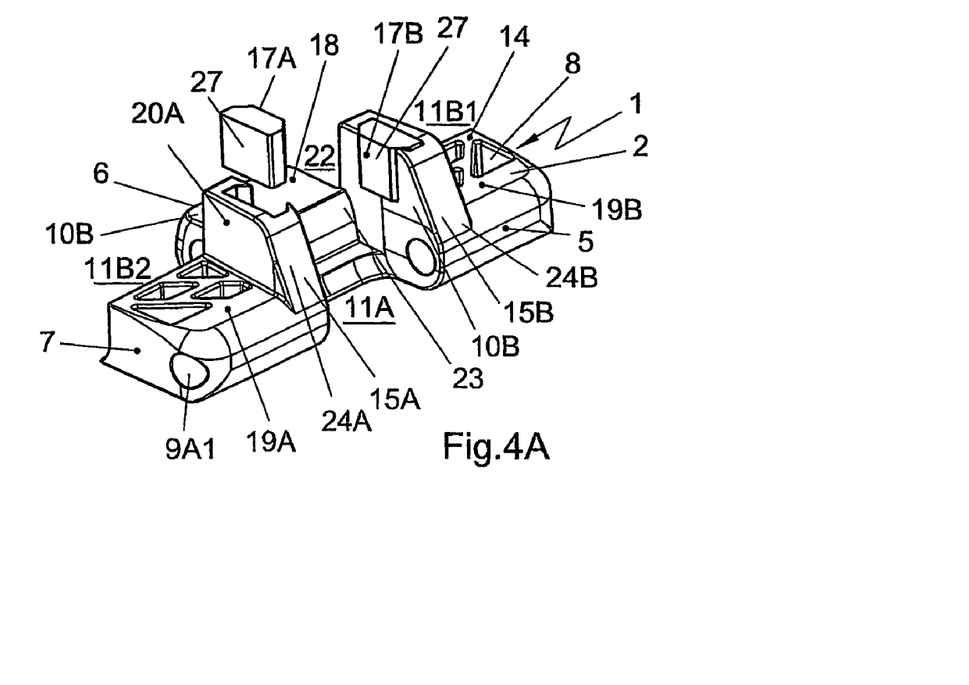
FIGS. 4A-4D show, each time, a schematic perspective view of the underside of the alternative embodiment of the module of FIG. 1 wherein one or more sliding faces are formed by insert pieces.
Figure 4B:
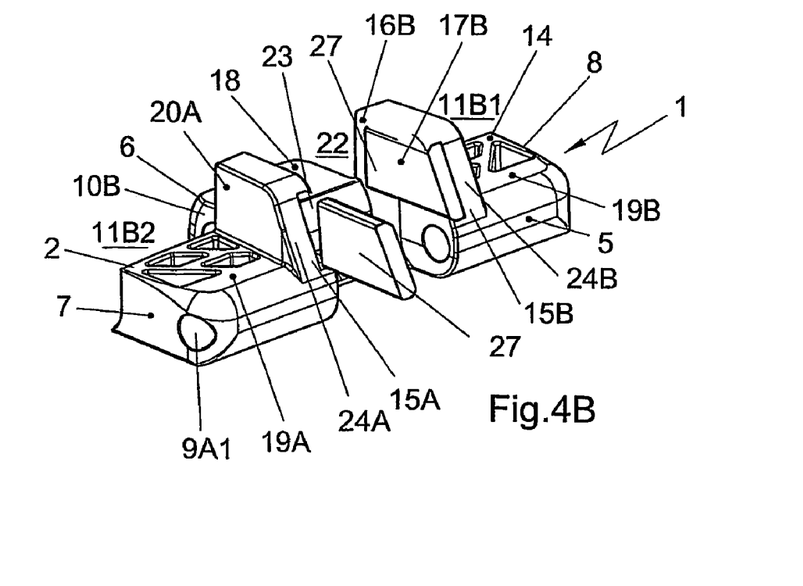
Figure 4C:
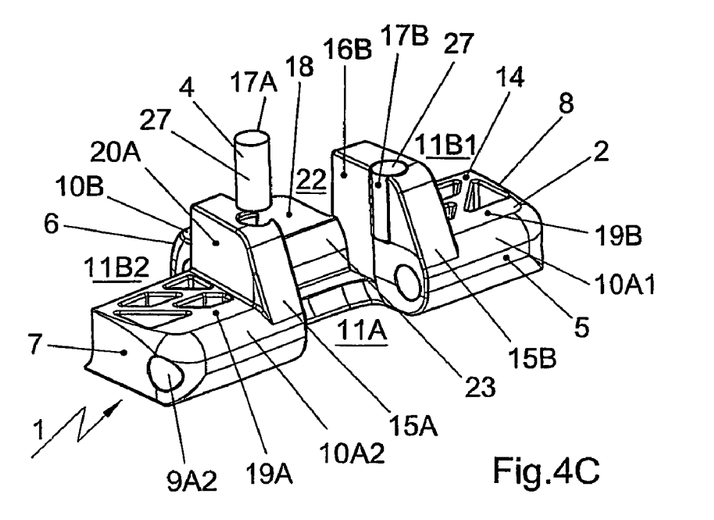
Figure 4D:
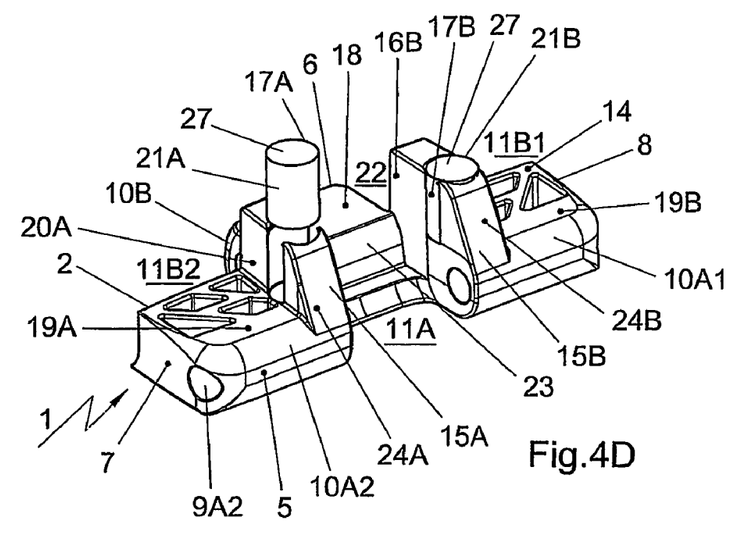

With reference to FIGS. 4a up to and including 4c, it is shown that the sliding faces 17a, 17b provided on the sides 16a, 16b facing each other of the projections 15a, 15b can be designed as insert pieces 27. The insert pieces can be designed from material with a greater resistance to wear and/or better sliding properties than the material of the module, which is designed in plastic such as POM, PBT and PA. The insert pieces 27 can be designed to be detachable and can be provided in the module 1 after injection molding. Naturally, the insert pieces 27 can also be provided in the mold cavity prior to the injection molding and can be integrally injection molded. Referring to FIG. 4d, it is shown that the insert pieces 27 can form several sliding surfaces, in this exemplary embodiment the inner sliding faces 17a, 17b and the outer sliding faces 21A, 21B.

Figure 5:
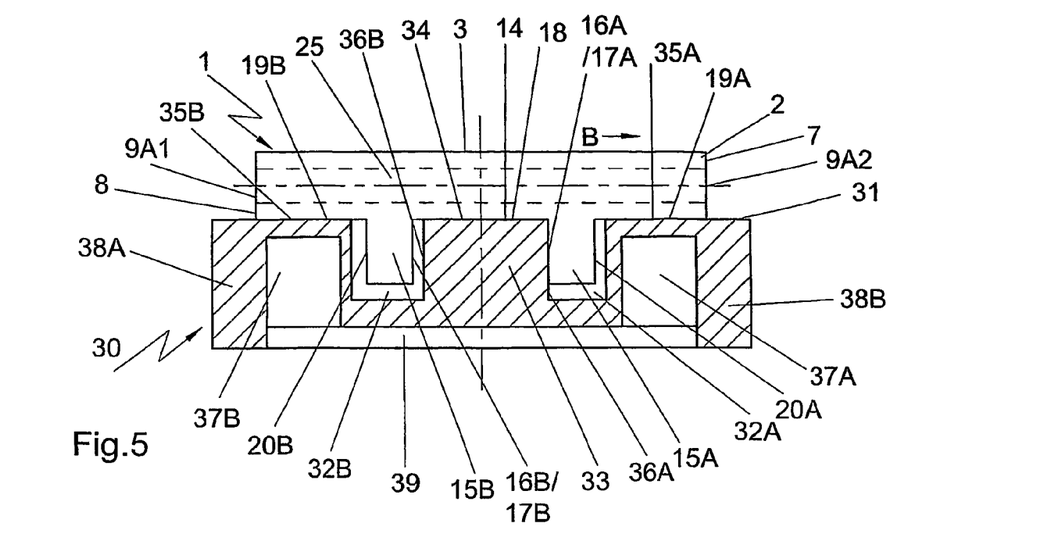
FIG. 5 shows a schematic cross-section of the module of FIG. 1 which cooperates with a guide bend segment.

Referring to FIG. 5, it is shown how a chain module 1 cooperates with a guide bend segment 30. The guide bend segment 30 is provided with a substantially flat upper side 31 in which two grooves 32a, 32b are provided in which the respective projections 15a, 15b of the chain module 1 can be included. Between the grooves 32a, 32b, a central projection 33 is formed. The top surface 31 is divided by the grooves 32a, 32b in a central face 34 located on the central projection 33 and an inner bend face 35B located at the inside bend and an outer bend face 35A located at the outside B of the bend. When negotiating the guide bend segment, at least one part of the connecting part and one leg of the U-shaped part of the longitudinal guide cooperate with at least one part of the upper side and a side face 36 of the central projection 33 of the guide bend segment 30. In this exemplary embodiment, it is shown that the outer sliding face 19a cooperates with the outside bend face 35A, that the auxiliary sliding face 19b cooperates with the inside bend face 35B, that the central face 34 cooperates with the central sliding face 18, and that the inner sliding face 17b cooperates with the outer face 36 of the central projection 33. In this manner, in the bend, an optimal support takes place, which is beneficial to the stability.

Figure 6:
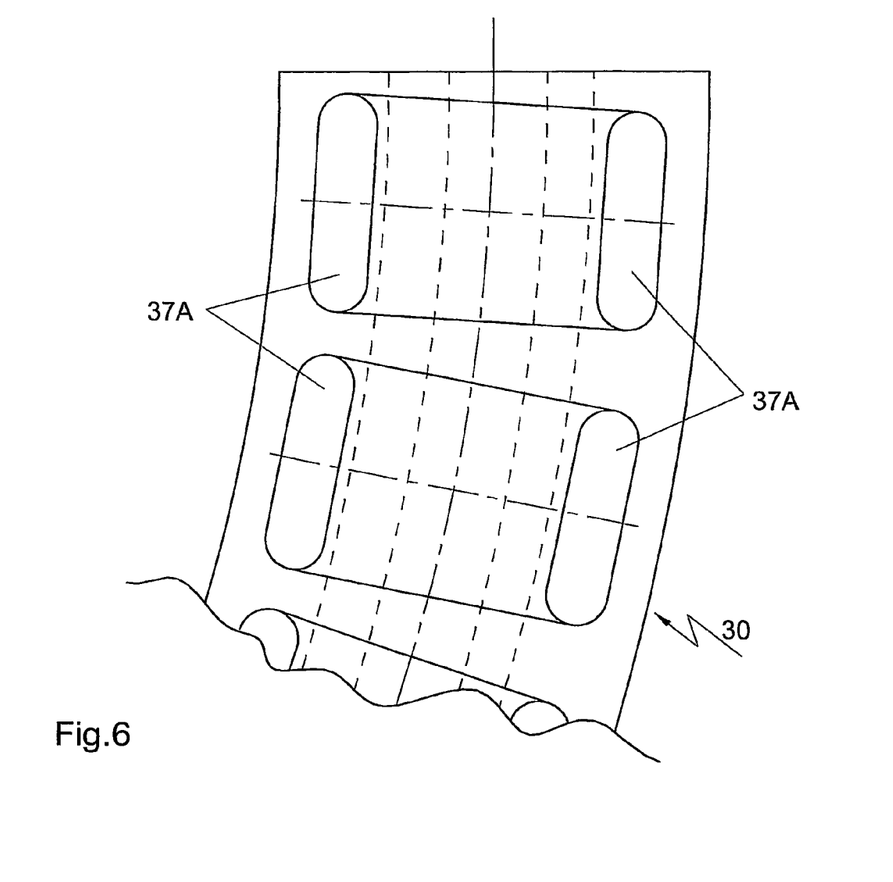
FIG. 6 shows a schematic bottom view of the guide bend segment of FIG. 5.
Figure 9:
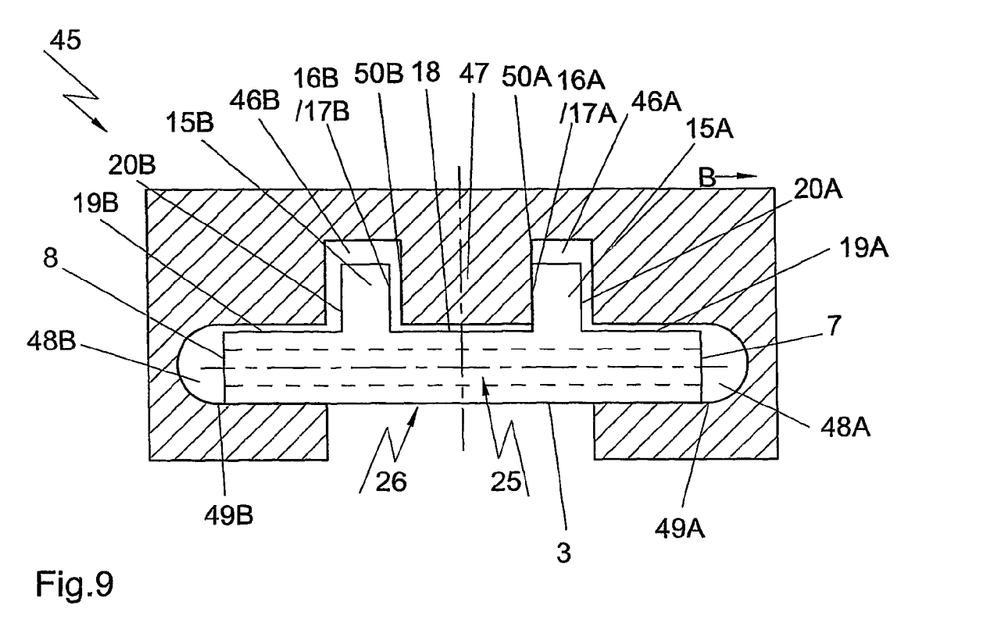
FIG. 9 shows a schematic cross section of a return part for a guide bend segment which cooperates with a module.

The bend segment 30 has a substantially lying, E-shaped cross-section. In FIG. 6, the bend segment 30 is represented in bottom view. The bend segment 30 can be provided with an integrated return part 45 for returning a bottom part of an endless chain (FIG. 9).

The bend segment 30 is provided with magnets 37a, 37b included in the legs 38a, 38b located adjacent the grooves 32a, 32b. The magnets are of the permanently magnetic type and, preferably, are designed from, for instance, ferritic magnets or neodymium magnets. The magnets 37a, 37b are connected by means of a metal closing plate 39, so that during use, the magnetic field of the magnets 37a, 37b can extend for a substantial part through a magnetic circuit through the magnets 37a, 37b and the closing plate 39 which is complemented with the aid of the hinge pins 25. With the aid of the magnets 37a, 37b, the hinge pins 25 are magnetized and the conveyor chain 26 is held in a level plane and tilting is prevented. In particular, it is advantageous that then, the magnets 37a, 37b included in the legs 38a, 38b cooperate with parts of the hinge pin 25 located adjacent the sides 7, 8 of the modules 1. As a result, when negotiating a bend, the magnets can cooperate with the part of the hinge pin located between the sides 7, 8 and the sides 20a, 20b facing away from each other and negotiating an outside bend, so that a maximum drawback moment against tilting of the module about its longitudinal axis can be supplied. As a result, the chain modules 1 are pulled by their undersides 14 against the top face 31 of the bend segment 30, such that the central sliding face 18 cooperates with the central face 34 and the respective auxiliary faces 19a, 19b cooperate with the inner face 35a and the outer face 35b.

Referring to FIG. 6, it is shown that each time, in pairs, the magnets 37a, 37b are connected with the aid of a closing plate 39 and that in longitudinal direction of the bend segment a number of pairs of magnets 37 are placed one behind the other.

It is noted that the sliding faces at the sides facing away from each other and the sides facing each other of the projections, respectively, extend substantially transversely to the underside 14 of the body part 2 of the chain module 1. In this context, as is elucidated with reference to FIGS. 5 and 6, "substantially transversely" is understood to include a situation in which a side face extends perpendicularly to the underside as well as a situation in which the sides include an angle which is some degrees greater or smaller than 90°.

Figure 7:
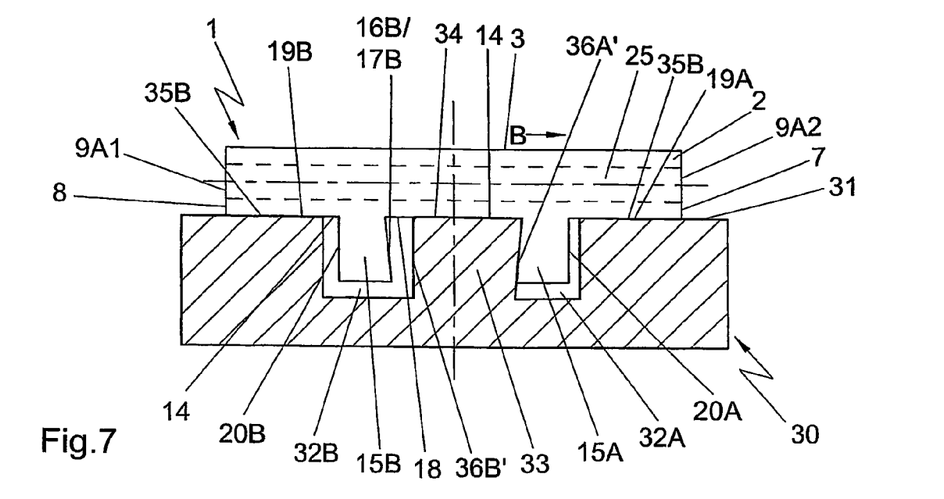
FIG. 7 shows an alternative embodiment of the guide bend segment of FIG. 5.

Referring to FIG. 7, it is shown that, when negotiating a bend segment 30, tilting of the modules 1 of the chain 26 can also be prevented by providing the central projection with one or more inclining side faces 36a', 36b', converging towards the base, and by designing the sliding faces 17a, 17b of the sides 16a, 16b facing each other of the projections 15a, 15b to converge, away from the body part 2 of the module. The central projection 33 and the clear intermediate space 22 then form, as it were, an oversize dovetail joint whose side faces cooperate when negotiating a bend. In the exemplary embodiment shown here, at the outside bend B, the side face 36b' cooperates with the inner sliding face 17b.

Optionally, a base type module of the sides 16a, 16b, facing each other of the projections 15a, 15b can, at will, be provided with insert pieces which proceed in a convergent or parallel manner, depending on the shape of the central projection of the guide bend segment.

It will be clear that the magnet construction shown in FIGS. 5 and 6 and the dovetail construction shown in FIG. 7 can be used each separately. Preferably, these constructions are also used in combination.

Figure 8:
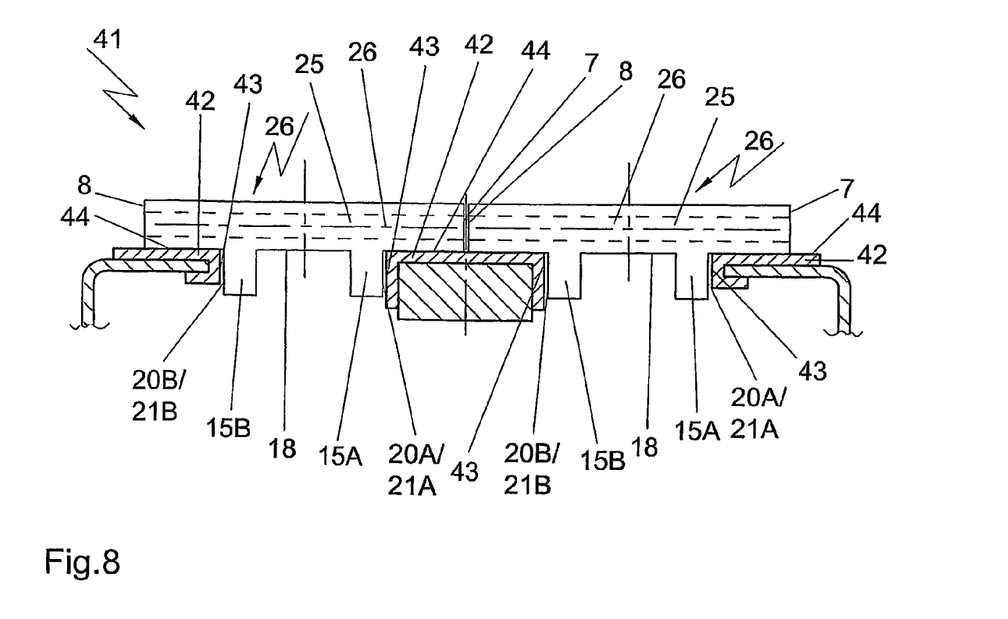
FIG. 8 shows a schematic cross-section of the two chain tracks of the module of FIG. 1 running side by side, which cooperate with a straight guide part of the guide path 1.

Referring to FIG. 8, a part 41 running straight of a guide path is shown in which two parallel chains 26 have been placed on and between parallel wear strips 42, spaced apart at a pitch of 85 mm and an intermediate space of 44 mm. The outer sliding faces 21a, 21b on the sides 20a, 20b facing away from each other of the projections 15a, 15b, i.e. the upstanding parts of the L-shaped guides then cooperate with the upstanding parts 43 of the wear strips, while the auxiliary sliding faces 19a, 19b, i.e. the lying parts of the L-shaped guide cooperate with the lying parts 44 of the wear strips 42.

Referring to FIG. 9, a return part 45 is shown for the guide bend segment of FIG. 7. The return part 45 is used when the conveyor chain 16 is designed as an endless chain which proceeds between at least two divert wheels and wherein between the divert wheels an upper part of the chain is formed which forms a conveying surface for the products to be conveyed and, located therebelow, between the divert wheels, a lower part in which the modules 1 of the transport chain are guided back.

Usually, the return part 45 is disposed below the guide bend segment 30 and is often integrated with the guide bend segment. The return part 45 comprises a receiving space which can be run through by the successive chain modules 1 so that they are guided and supported. The receiving space comprises two standing grooves 46A, 46B for receiving the projections 15a, 15b of the chain modules 1. Between the standing grooves, in the return part 45, a central projection 47 is formed. The receiving space further comprises grooves 48A, 48B of level orientation for receiving the body parts 2 of the chain modules 1. The level grooves 48A, 48B each comprise sliding faces 49A, 49B which support the upper side 3 of the body parts 2. The standing grooves 46A, 46B each comprise guiding faces 50A, 50B provided on each side of the central projection 47A for guiding the inner sliding faces 17A, 17B at the sides 16A, 16B facing each other of the projections 15A, 15B. If the sides 16A, 16B facing each other of the projections 15A, 15B are designed having inclining inner sliding faces 17A, 17B, the central projection 47 of the return part 45 can also be designed with a correspondingly inclining guide face 50A or 50B at at least the outside bend side of the central projection 47. The return part can also be used in the part of the guide path running straight and in a part of the guide path negotiating a bend. In a part of the return part 45 running straight, naturally, the two guide faces 50A, 50B can be designed at an inclination so that they converge in upward direction and correspond with inclining guide faces 17A, 17B of the chain modules 1. It is noted that, naturally, it is possible to design the return part 45 in a different manner.

It will be clear to the skilled person that the invention is not limited to the exemplary embodiments described herein and that many variants are possible within the range of the invention as set forth in the following claims.

The invention claimed is:

1. A chain module for a modular chain conveyor, comprising a substantially sheet-shaped body part provided with a conveying face located at an upper side of the body part, with hinge holes included in the body part and with two projections provided at the underside of the body part, while sliding faces located at the sides facing each other of the projections, together with a sliding face located between the projections at the underside of the body part form a longitudinal guide with a substantially U-shaped cross section, wherein the projections have been provided at a distance from the sides of the body part and that adjacent the projections, at the underside of the body part, sliding faces are located, each forming, with sliding faces located at sides facing away from each other the projections, a longitudinal guide with substantially L-shaped cross section, wherein two bulging hinge loops on the one side of the module are each provided with a coaxial hinge hole with substantially identical, constant cross section and wherein a hinge loop, correspondingly formed with a recess, is provided at the opposite side with a slotted hole with a cross section which is at least equal to and, over at least a part of the cross section, is greater than the cross section of the cylindrical holes.

2. A chain module according to claim 1, wherein the hinge holes extend along a front and rear side of the module and wherein the cross section of the holes at the front and rear side differs per side at least locally.

3. A chain module according to claim 1, wherein the hinge holes together extend over at least the entire width of the body part.

4. A chain module according to claim 1, wherein adjacent the front or rear side of the module, at least one side of the body part, an opening of a hinge hole is located.

5. A chain module according to claim 1, wherein the body part is provided at a front or rear side with two bulging hinge loops with a recess located therebetween and wherein, on the opposite side, the body part is further provided with a bulging hinge loop formed correspondingly to the recess.

6. A chain module according to claim 5, wherein the sides of the guiding projections facing each other are each contiguous to the recess between the bulging hinge loops.

7. A chain module according to claim 1, wherein the space between the sides of the projection facing each other for including a central projection of a guide bend segment is clear of obstructions.

8. A chain module according to claim 1, wherein the sliding faces at the sides facing each other of the projections extend substantially transversely to the underside of the body part.

9. A chain module according to claim 1, wherein the sliding faces at the sides facing each other of the projections converge from the body part.

10. A chain module according to claim 1, wherein, at a part of the front or rear extending between the projections, the body part is provided with a driving face.

11. A chain module according to claim 1, wherein the sliding faces on the sides facing away from each of the projections other extend substantially transversely to the underside of the body part.

12. A chain module according to claim 1, wherein the height of the body part between the underside and the conveying surface is 12.8 mm.

13. A chain module according to claim 1, wherein at least the body part and the projections are manufactured from plastic material.

14. A modular chain comprising a series of successive modules according to claim 1 which are coupled with the aid of hinge pins reaching through cooperating hinge loops.

15. A modular chain according to claim 14, wherein the hinge pins extend substantially over the entire width of the body part.

16. A modular chain according to claim 15, wherein the hinge pins are manufactured from magnetic or magnetizable material.

* * * * *